(12) United States Patent
Liang et al.

(10) Patent No.: US 8,681,286 B2
(45) Date of Patent: Mar. 25, 2014

(54) LIQUID CRYSTAL DISPLAY AND BACKPLANE OF BACK LIGHT MODULE THEREOF

(75) Inventors: Shuozhen Liang, Shenzhen (CN); Hsiao Ken, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 84 days.

(21) Appl. No.: 13/375,252

(22) PCT Filed: Jul. 18, 2011

(86) PCT No.: PCT/CN2011/077263
§ 371 (c)(1),
(2), (4) Date: Nov. 30, 2011

(87) PCT Pub. No.: WO2013/004028
PCT Pub. Date: Jan. 10, 2013

(65) Prior Publication Data
US 2013/0010407 A1    Jan. 10, 2013

(30) Foreign Application Priority Data
Jul. 6, 2011   (CN) .......................... 2011 1 0187975

(51) Int. Cl.
*G02F 1/133*   (2006.01)
(52) U.S. Cl.
USPC .............................................. 349/58; 349/61
(58) Field of Classification Search
None
See application file for complete search history.

(56) References Cited

U.S. PATENT DOCUMENTS

| | | | |
|---|---|---|---|
| 6,181,390 B1 * | 1/2001 | Wang et al. ..................... | 349/58 |
| 8,300,197 B2 * | 10/2012 | Inoue ............................. | 349/150 |
| 2001/0024260 A1 * | 9/2001 | Kitada .......................... | 349/149 |
| 2005/0088586 A1 * | 4/2005 | Mori et al. ..................... | 349/62 |
| 2006/0028790 A1 * | 2/2006 | Baek ............................. | 361/681 |
| 2006/0146223 A1 * | 7/2006 | Iwai et al. ...................... | 349/58 |

(Continued)

FOREIGN PATENT DOCUMENTS

| | | |
|---|---|---|
| CN | 101149495 A | 3/2008 |
| CN | 101216633 A | 7/2008 |

(Continued)

OTHER PUBLICATIONS

Guo Dong, the first office action, Oct. 2012, CN.

(Continued)

*Primary Examiner* — Mike Stahl
(74) *Attorney, Agent, or Firm* — IPro, Inc; Na Xu

(57) ABSTRACT

The present invention discloses a liquid crystal display (LCD) and a backplane of a back light module thereof. The LCD comprises a back cover, one or more circuit boards and a backplane of a back light module. One or more circuit board attaching devices for attaching the circuit boards are arranged on the interior sidewall of the back cover and void spaces for avoiding the circuit boards are arranged at the corresponding position of the backplane. As the circuit boards installed prior to this invention on the backplane is now installed on the back cover instead, the backplane of the back light module of the LCD is not provided with the bumps for attaching the circuit boards any more; the structure of the backplane and the manufacturing process of the backplane are simpler. Furthermore, as the back cover is insulated, the bumps are not arranged, and the circuit boards can be attached by simple circuit board attaching devices, significantly simplifying the process.

7 Claims, 3 Drawing Sheets

(56) References Cited

U.S. PATENT DOCUMENTS

| | | |
|---|---|---|
| 2008/0084520 A1* | 4/2008 | Nam et al. .................... 349/65 |
| 2009/0185102 A1 | 7/2009 | Lee |
| 2010/0066937 A1* | 3/2010 | Yamashita et al. ............ 349/58 |
| 2010/0165642 A1* | 7/2010 | Hsieh et al. .................. 362/362 |
| 2010/0259704 A1* | 10/2010 | Fu et al. ........................ 349/58 |
| 2011/0037789 A1* | 2/2011 | Hisakawa ..................... 345/690 |

FOREIGN PATENT DOCUMENTS

| | | | |
|---|---|---|---|
| CN | 101446698 A | | 6/2009 |
| CN | 201322833 Y | | 10/2009 |
| CN | 201548778 U | | 8/2010 |
| CN | 102043264 A | | 5/2011 |
| KR | 10-2006-0010224 A | * | 2/2006 |
| KR | 1020080101044 A | | 11/2008 |
| WO | WO 2009/131093 A1 | * | 10/2009 |

OTHER PUBLICATIONS

Shang Aixue, the International Searching Authority written comments, Mar. 2012, CN.

Guo Dong, the second office action, Jun. 2013, CN.

* cited by examiner

LIQUID CRYSTAL DISPLAY AND BACKPLANE OF BACK LIGHT MODULE THEREOF

TECHNICAL FIELD

The present invention relates to the field of displays, in particular to a liquid crystal display (LCD) and a backplane of a back light module thereof.

BACKGROUND

Due to the characteristics of lightweight, small size, small thickness, etc., LCD devices, such as LCD displays, LCD televisions, etc., are widely used in daily life. The back light module in the LCD is used for supplying a uniform and adequate power supply for the LCD panel, but the backplane of the back light module mainly performs a supporting function on the whole module. In addition, all circuit boards for the completed assemblies are installed on the backplane of the back light module in the existing LCDs. Therefore, a circuit board attaching area is arranged on the backplane as required. In prior art, a large number of bumps are processed on the circuit board attaching area for attaching the circuit boards, as shown in FIG. 1. The structures of the backplane and especially the circuit board attaching area 8 are complicated, which results in the complicated manufacturing process of the backplane and the circuit board attaching area 8 and the increased manufacturing cost.

SUMMARY

The aim of the present invention is to provide a LCD and a backplane of a back light module thereof of a simplified structure.

The purpose of the present invention is achieved by the following technical schemes.

A LCD comprises a back cover, one or more circuit boards and a backplane of a back light module. One or more circuit board attaching devices for attaching the circuit boards are arranged on an interior sidewall of the back cover, and one or more void spaces for avoiding the circuit boards are arranged at the corresponding positions of the backplane.

The positions corresponding to the circuit boards attached on the back cover of said backplane are hollow, and the hollow positions are the void spaces. This design can save the material cost of the backplane.

Said backplane comprises more than two backplane sheets; said backplane sheets are joined to form the backplane. By dividing the backplane of a complicated structure into a plurality of backplane sheets of relatively simple structures, the structural shape of a die can be simplified and the cost of the die can be reduced; the backplane designed prior to this invention is integrally formed and needs a stamping press of a large tonnage; however, the backplane designed herein allows the use of a stamping press of a small tonnage, thereby reducing the cost and facilitating the stamping.

Said backplane comprises an upper backplane sheet, a lower backplane sheet, two side backplane sheets and a middle backplane sheet; the upper backplane sheet, the lower backplane sheet and the two side backplane sheets are joined into a frame; the middle backplane sheet is arranged in the middle of the backplane and is respectively joined with the upper backplane sheet and the lower backplane sheet; and the hollow void spaces are formed among the middle backplane sheet and the two side backplane sheets. This is one embodiment of the backplane.

The circuit board attaching devices arranged on the back cover are circuit board attaching structures integrally formed on the back cover, and the circuit boards are attached to the back cover.

A backplane of a back light module of a LCD is disclosed, which comprises one or more void spaces arranged at the positions of the backplane corresponding to the circuit boards attached on the back cover of the LCD.

The positions at the backplane corresponding to the circuit boards attached on the back cover are hollow, and the hollow positions are the void spaces. This design can save the material cost of the backplane.

Said backplane comprises more than two backplane sheets that are joined to form the backplane. By dividing the backplane of a complicated structure into a plurality of backplane sheets of relatively simple structures, the structural shape of a die can be simplified and the cost of the die can be reduced; the backplane designed prior to this invention is integrally formed and needs a stamping press of a large tonnage; however, the backplane designed herein allows the use of a stamping press of a small tonnage, thereby reducing the cost and facilitating the stamping.

Said backplane comprises an upper backplane sheet, a lower backplane sheet, two side backplane sheets and a middle backplane sheet; the upper backplane sheet, the lower backplane sheet and the two side backplane sheets are joined into a frame; the middle backplane sheet is arranged in the middle of the backplane and is respectively joined with the upper backplane sheet and the lower backplane sheet; and the hollow void spaces are formed among the middle backplane sheet and the two side backplane sheets. This is one embodiment of the backplane.

The backplane sheets are joined by a method of laser welding. The method of laser welding provides convenience and high precision and is suitable for processing the backplane.

Because the circuit board is installed on the back cover but not installed on the backplane, the backplane of the back light module of the LCD is not provided with the bumps for attaching the circuit board any more; the structure of the backplane and the manufacturing process of the backplane are simpler. Furthermore, as the back cover is insulated, the bumps are not arranged, and the circuit board can be attached by a simple circuit board attaching device, significantly simplifying the process.

Wherein: 1. circuit board, 2. backplane, 3. back cover, 4. screw, 5. external port, 6. hollow void space, 7. welding line, 21. upper backplane sheet, 22. lower backplane sheet, 23. middle backplane sheet, 24. right side backplane sheet, 25. left side backplane sheet and 8. circuit board attaching area.

DETAILED DESCRIPTION

The present invention is further described by figures and the preferred embodiments as follows.

Figure 1:
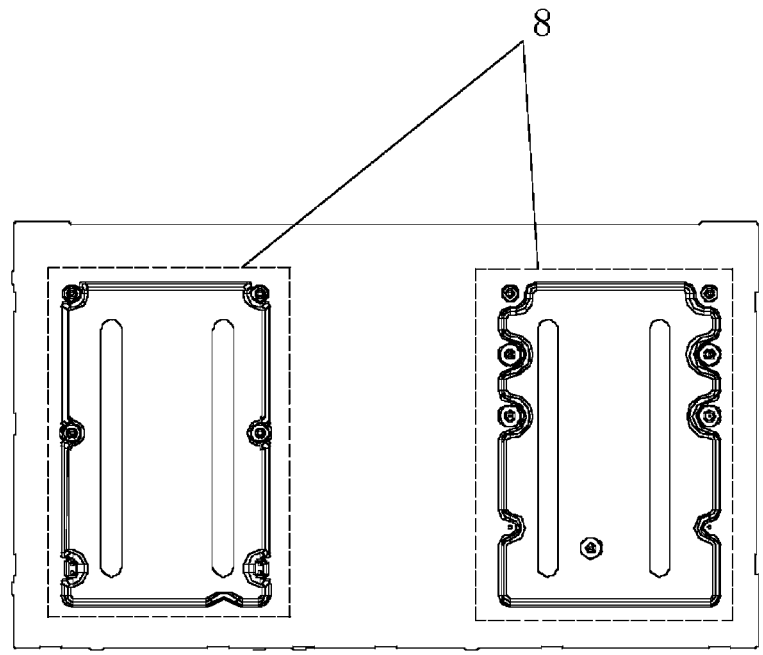
FIG. 1 is the structural diagram of the backplane in the prior art.
Figure 2:
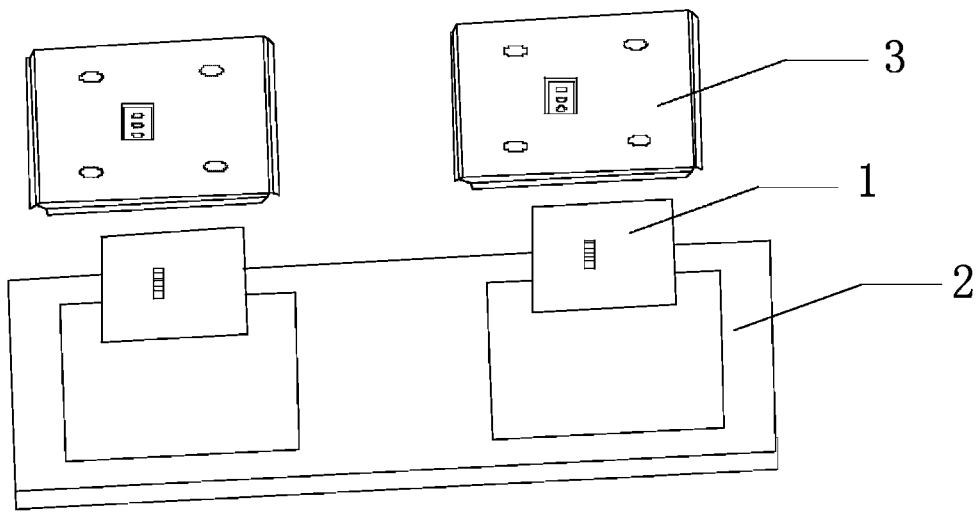
FIG. 2 is the explosion diagram of the assembly of one embodiment of the present invention.
Figure 3:
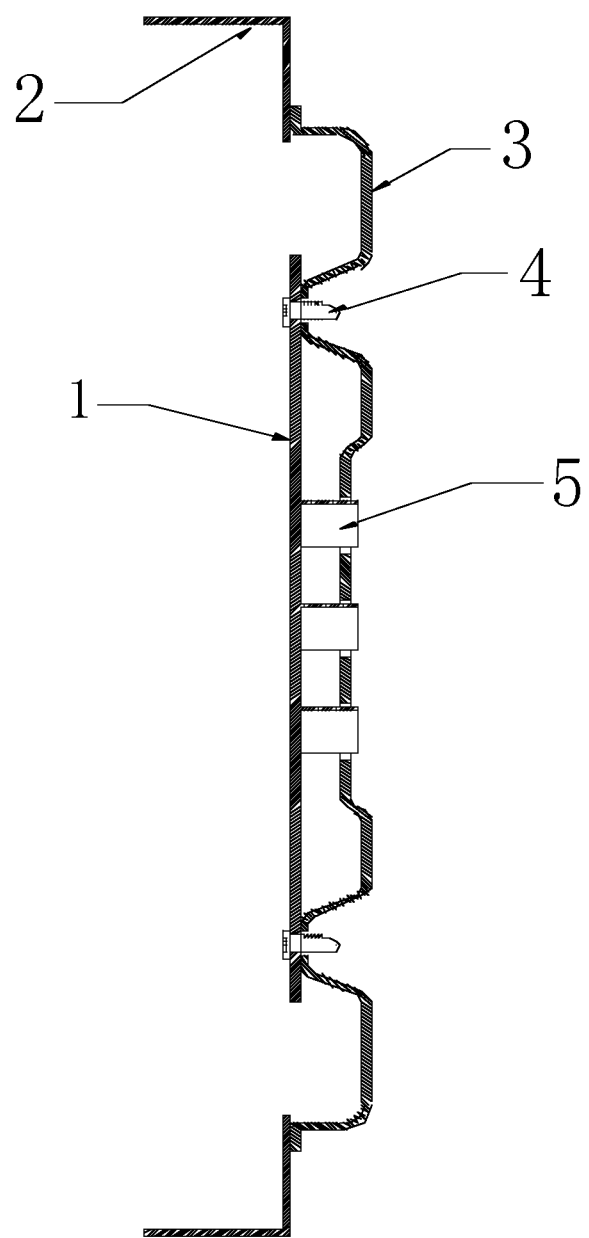
FIG. 3 is the sectional diagram of the assembly of the circuit board of one embodiment of the present invention.

As shown in FIG. 2 and FIG. 3, the LCD comprises a back cover, a circuit board, a back light module, etc. The interior of the sidewall of the back cover is provided with a circuit board attaching device for attaching the circuit boards; the circuit boards are fixed to the interior of the sidewall of the back cover directly by the circuit board attaching device; and correspondingly, the corresponding position of the backplane of the back light module is provided with void spaces for avoiding the circuit boards.

The circuit board attaching devices arranged on the back cover 3 can be the circuit board attaching structures integrally formed on the back cover 3. The circuit board 1 is attached to the back cover. The circuit board attaching structure can be in the form of a bolt; the circuit board 1 of the LCD is attached to the back cover 3 by screws 4; the back cover 3 is provided with screw holes corresponding to the screws 4 and is also provided with a through hole corresponding to the external port 5 of the circuit board 1. The structure of the backplane 2 is shown in FIG. 3; the backplane 2 is provided with a hollow void space 6; and the installation position of the circuit board 1 is positioned in the hollow void space 6.

As the circuit board 1 is directly attached to the back cover 3, the backplane 2 is not provided with bumps or other attaching structures for attaching the circuit boards; the manufacturing steps of the backplane are reduced and the structure of the backplane is simplified. Only the space for installing the circuit board 1 on the backplane is reserved as required, i.e. an void space: the void space can be a hollow void space 6 on the backplane 2 shown in FIG. 4 and FIG. 5 as well as a concave void space reserved on the corresponding concave part of the backplane 2, as long as the void space is adequate for installing the circuit board 1. Compared with the backplane with the concave void space, the backplane with the hollow void space is easier to process and saves more materials. Therefore, the backplane with the hollow void space 6 is preferred in the embodiment.

Figure 5:
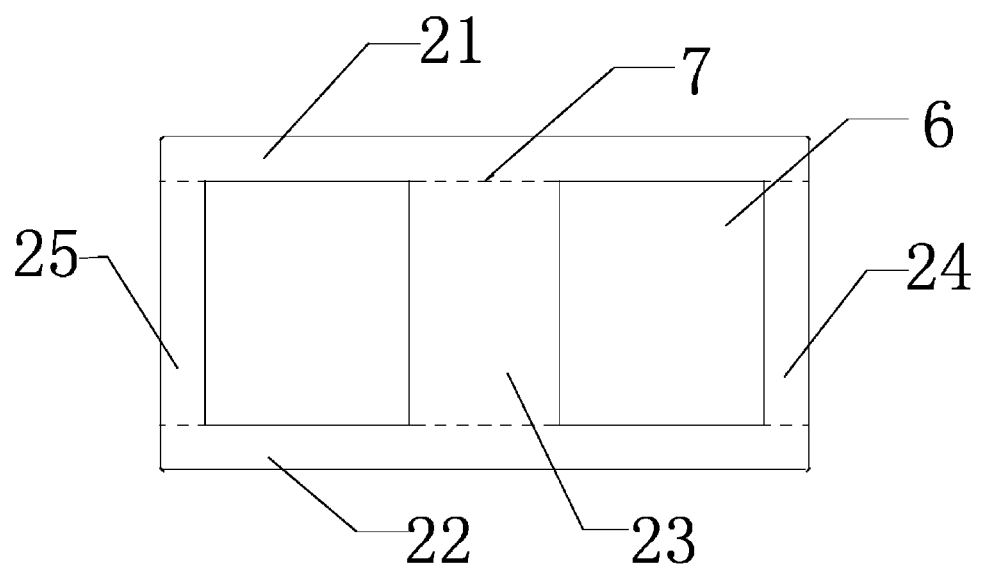
FIG. 5 is the structural diagram of the backplane of another embodiment of the present invention.

As the backplane in the embodiment has a simple and regular structure and certain divisibility, the backplane can be divided into more than two backplane sheets of simpler structures and the backplane sheets are joined to form the backplane. The structure of the backplane can be specifically designed according to the specific shape of the backplane and the position of the void space for the circuit board. FIG. 5 shows the structure of a backplane which comprises an upper backplane sheet, a lower backplane sheet, two side backplane sheets and a middle backplane sheet; the upper backplane sheet, the lower backplane sheet and the two side backplane sheets are joined into a frame; the middle backplane sheet is arranged in the middle of the backplane and is respectively joined with the upper backplane sheet and the lower backplane sheet; and the hollow void spaces is formed among the middle backplane sheet and the two side backplane sheets. The dashed lines in FIG. 5 illustrates the positions of the welding lines 7; the backplane 2 can be processed into a one whole piece by the methods of laser welding or other welding or joining using the upper backplane sheet 21, the lower backplane sheet 22, the left side backplane sheet 25, the right side backplane 24 and the middle backplane sheet 23. The method of laser welding provides convenience and higher precision and is suitable for processing the backplane.

Figure 4:
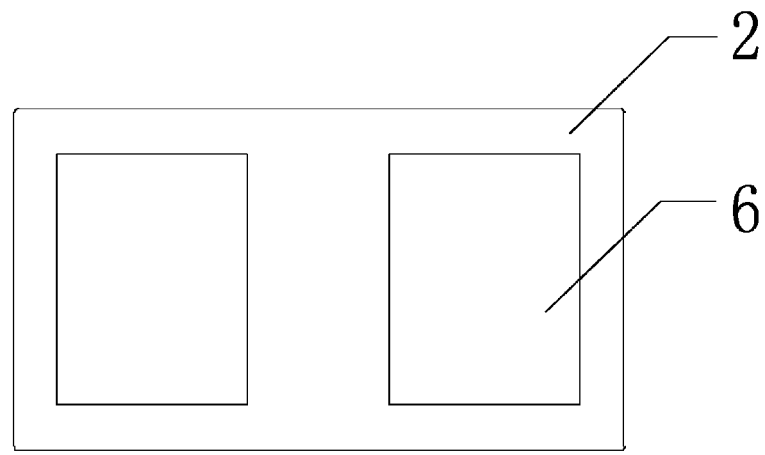
FIG. 4 is the structural diagram of the backplane of one embodiment of the present invention.

By dividing the backplane of a complicated structure into a plurality of backplane sheets of relatively simple structures, the structural shape of a die can be simplified and the cost of the die can be reduced; the backplane shown in FIG. 4 prior to this invention is formed in one step; this not only wastes the materials of a middle hollow part, but also requires a stamping equipment of a large tonnage and is associated with increased processing cost; however, the joined backplane only requires a stamping equipment of a small tonnage, facilitates ultimately the obtaining of a non-backplane module, reduces the cost and facilitates the stamping. The backplane sheets of simpler structures are firstly stamped and then joined into the backplane, and this process is simpler than that of the backplane of a complicated structure.

The present invention is described in detail in accordance with the above contents with the specific preferred embodiments. However, this invention is not limited to the specific embodiments. For example, in the embodiment, the circuit board 1 of the LCD also can be attached to the back cover 3 by other ways except screws, e.g. fastening structures. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. A liquid crystal display (LCD), comprising: a back cover;
one or more circuit boards; one or more backplanes without bumps formed thereon of a back light module; one or more circuit board attaching devices for attaching the circuit boards, said circuit board attaching devices being disposed on an interior sidewall of the back cover; and one or more void spaces for avoiding the circuit boards, said void spaces being disposed at a corresponding positions of the backplane, each size of the void space being not less than that of each corresponding circuit board, wherein said backplane comprises more than two backplane sheets that are joined to form the backplane at a horizontal direction.

2. A LCD of claim 1, wherein said positions of the backplane corresponding to the circuit boards attached on the back cover are hollow and the hollow positions are the void spaces.

3. A LCD of claim 2, wherein said backplane comprises an upper backplane sheet, a lower backplane sheet, two side backplane sheets and a middle backplane sheet; the upper backplane sheet, the lower backplane sheet and the two side backplane sheets are joined into a frame at a horizontal direction; the middle backplane sheet is arranged in the middle of the backplane and is respectively joined with the upper backplane sheet and the lower backplane sheet; and hollow void spaces are formed between the middle backplane sheet and the two side backplane sheets respectively.

4. A LCD of claim 1, wherein said circuit board attaching devices arranged on the back cover are circuit board attaching structures integrally formed on the back cover, and the circuit boards are attached to the back cover.

5. A backplane of a back light module of a LCD, wherein one or more void spaces are arranged at the positions of a backplane without bumps formed thereon corresponding to circuit boards attached on the back cover of a LCD device, each size of the void space being not less than that of each corresponding circuit board, wherein said positions of the backplane corresponding to the circuit boards attached on the back cover are hollow and the hollow positions are the void spaces, wherein said backplane comprises more than two backplane sheets that are joined to form the backplane at a horizontal direction.

6. A backplane of a back light module of a LCD of claim 5, wherein said backplane comprises an upper backplane sheet, a lower backplane sheet, two side backplane sheets and a middle backplane sheet; the upper backplane sheet, the lower backplane sheet and the two side backplane sheets are joined into a frame at a horizontal direction; the middle backplane sheet is arranged in the middle of the backplane and is respectively joined with the upper backplane sheet and the lower backplane sheet; and hollow void spaces are formed between the middle backplane sheet and the two side backplane sheets respectively.

7. A backplane of a back light module of a LCD of claim 5, wherein said backplane sheets are joined by a method of laser welding.

\* \* \* \* \*